US005213695A

United States Patent [19]

Pinder

[11] Patent Number: 5,213,695

[45] Date of Patent: May 25, 1993

[54] APPARATUS AND METHOD FOR SEPARATING SOLIDS AND LIQUIDS

[76] Inventor: Stanley N. Pinder, 4124 Alatia Blvd., Brandon, Fla. 33511

[21] Appl. No.: 839,534

[22] Filed: Feb. 20, 1992

[51] Int. Cl.[5] .......... B01D 37/00

[52] U.S. Cl. .......... 210/767; 210/242.1; 210/256; 210/259; 100/116; 100/226; 100/37

[58] Field of Search .......... 210/767, 776, 242.2, 210/242.3, 242.4, 256, 242.1, 259; 100/45, 118, 99, 233, 237, 37, 90, 110, 116, 226

[56] References Cited

U.S. PATENT DOCUMENTS 4,019,984 4/1977 Mohn .......... 100/37
4,303,412 12/1981 Baikoff .......... 100/37
4,343,233 8/1982 Burgin .......... 100/37
4,676,154 6/1987 Steinort .......... 100/37
5,001,911 3/1991 Eck et al. .......... 100/116

FOREIGN PATENT DOCUMENTS 794551 2/1936 France .......... 100/226

*Primary Examiner*—Mary Lynn Theisen
*Assistant Examiner*—Ana M. Fortuna
*Attorney, Agent, or Firm*—Joseph C. Mason, Jr.; Ronald E. Smith

[57] ABSTRACT

An apparatus for separating solids and liquids includes a pair of compaction chambers into each of which is inserted a fifty five gallon drum that receives the liquids and solids before they are separated. A compaction platen has a liquid-retaining wall mounted about its periphery in trailing relation to the platen, and separation of the solids and liquids is accomplished by lowering the platen into a container that has been filled with flotsam including liquids and solids. The platen has a breadth slightly less than the breadth of the container so that liquids may escape around the peripheral border of the platen as it descends into the container. The escaping liquids are collected on the trailing end of the platen by the retention wall and are carried under a vacuum or pumped to a liquid storage facility for further treatment. The platen is telescopically mounted in a housing that reciprocates between the compaction chambers so that the separation process is continuous.

22 Claims, 2 Drawing Sheets

APPARATUS AND METHOD FOR SEPARATING SOLIDS AND LIQUIDS

TECHNICAL FIELD

This invention relates to means for separating solids and liquids. More particularly, it relates to a device and method having utility in separating liquids and solids in flotsam recovered from a body of water.

BACKGROUND ART

Damage to wildlife and the physical environment can be minimized in the wake of an oil spill in a body of water if containment and recovery operations are started promptly after the spill. Accordingly, a specialized fleet of ships is currently being built in the United States for the sole purpose of responding quickly to oil spills. The ships will be stationed at strategic locations and will be maintained on a twenty four hour alert status so that they can be on the way to a spill in less than half an hour. In this manner, the oil spill problem will be handled along lines developed by the firefighting industry.

The new ships will be fitted, to some extent, with equipment already in use on existing spill-containment vessels. However, some items of existing equipment are inadequate to perform their intended functions. For example, the primary containment method is to vacuum up the spilled oil as it floats on the water. The oil thereby recovered is typically mixed with debris or flotsam; this flotsam includes liquids and solids which must be separated from one another before the recovered oil can be placed in a hold of the recovery ship or in containers for subsequent refining.

More specifically, the flotsam is generally collected on a large, perforated plate that acts as a strainer to separate the oil and solids in the flotsam. However, the solids are usually soaked with water and covered with oil; the oil clinging to the solids is not affected by the straining action of the perforated plate. Present practice is to discard the solids and oil coated thereon in fifty five gallon drums. Thus, the oil coated on the solids is lost. Moreover, the drum must then be treated as hazardous waste and disposed of as such. Obviously, the number of drums that are filled with oil-soaked solids at a major spill is large, and their disposal is a problem almost as troublesome as the spill itself.

There is a need for a flotsam separation device and method that enables a spill to be cleaned up with fewer drums and that salvages more oil from the spill as well, but the prior art, when considered as a whole at the time the present invention was made in accordance with the requirements of law, neither taught nor suggested to those of ordinary skill in this art how such a device and method could be provided. In fact, at the time the present invention was made, the conventional wisdom was that the status quo was satisfactory, and that liberal use of fifty five gallon drums and the loss or large quantities of oil would always be a fact of oil spill experience.

DISCLOSURE OF INVENTION

The present invention includes means for packing large quantities of flotsam into a single fifty five gallon drum and for separating oil and other liquids from that flotsam so that the oil may be subsequently refined and used.

The novel device further includes means for loading flotsam into a second drum while the flotsam in a first drum is being compressed and the liquids associated therewith are being separated therefrom. In this manner, by the time the second drum is full, the flotsam in the first drum will have been compressed and liquids in said first drum will have been removed therefrom so that additional flotsam may be tossed into said first drum. While the first drum is being filled with further flotsam, the flotsam in the second drum is compressed, and the liquid is separated therefrom and removed from the drum to make room for further flotsam therein. In this way, flotsam can be tossed into the two drums on a continuous basis. A suitable cart is also provided to enable quick replacement of a full drum with an empty one so that the flotsam/oil separation process can be conducted continuously during an oil spill cleanup effort.

The primary object of this invention is to provide a means for packing a large quantity of flotsam into a fifty five gallon drum or container of differing capacity.

A closely related object is to separate oil from the flotsam for subsequent refining.

Another object is to provide a system that can be operated continuously so that it does not impede oil spill cleanup efforts.

Still another object is to provide a system that is suitable for use in situations other than oil spill cleanups.

These and other important objects, features and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

Similar reference numerals refer to similar parts throughout the several views of the drawings.

BEST MODES FOR CARRYING OUT THE INVENTION

Figure 1:
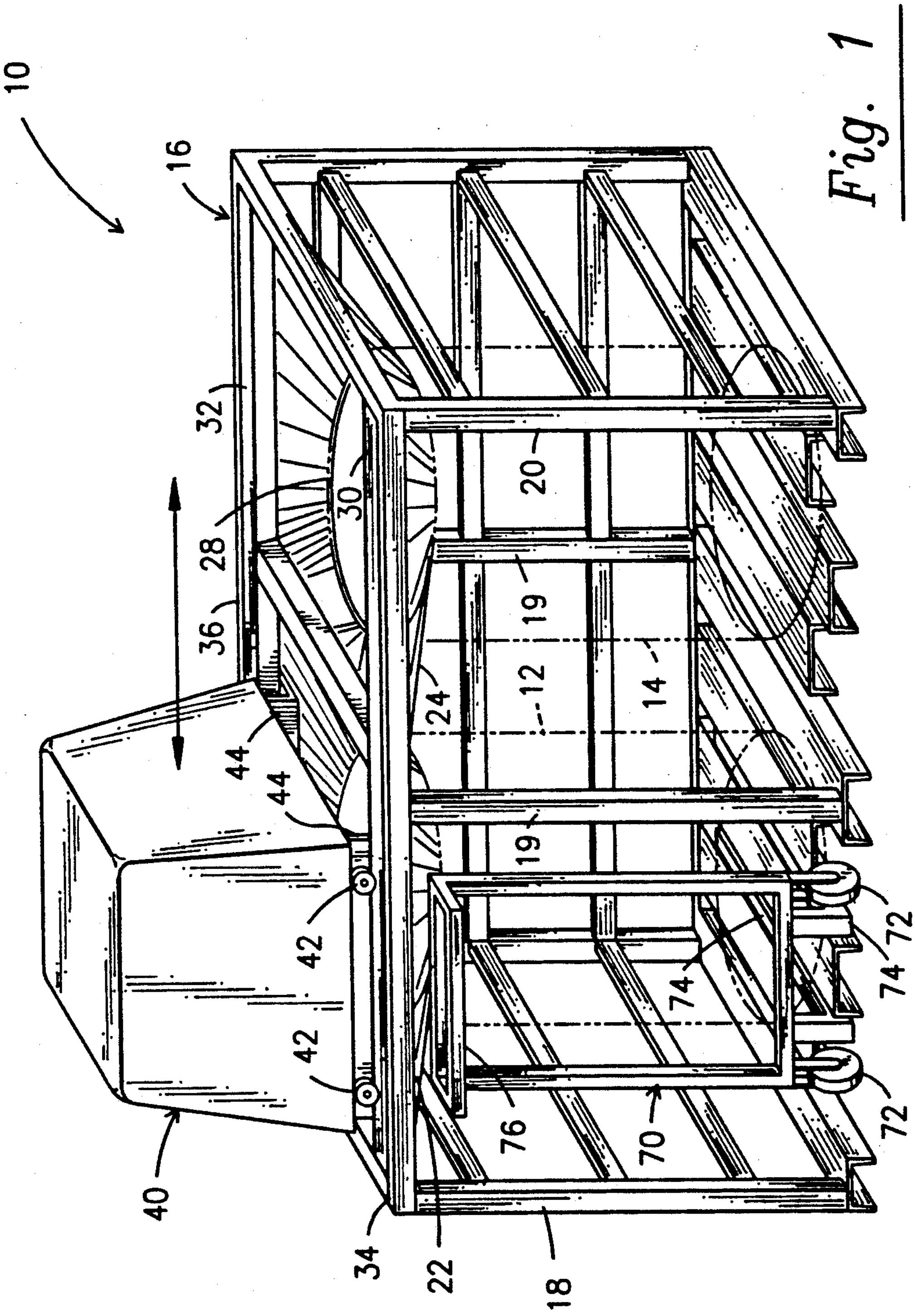
FIG. 1 is a perspective view of an exemplary embodiment of the invention.

Referring now to FIG. 1, it will there be seen that an illustrative embodiment of the invention is denoted as a whole by the reference numeral 10.

Apparatus 10 accommodates a pair of fifty five gallon drums 12 and 14, shown in phantom lines, that are removably mounted in an open framework denoted 16 as a whole. The open framework lightens the apparatus, enables quick cleaning thereof, and inhibits dirt and grime buildup therein. Although not shown, suitable locking means are provided to lock the drums into the position shown in FIG. 1 throughout the separation process.

Figure 2:
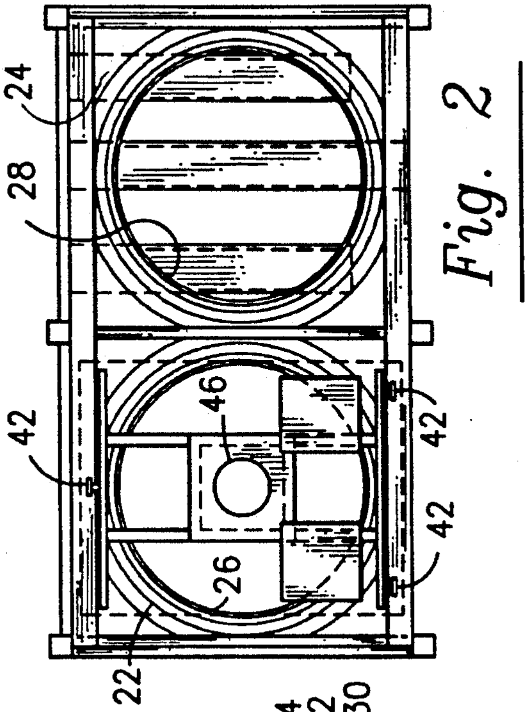
FIG. 2 is a top plan view thereof.

Frame 16 includes two laterally disposed, contiguous compaction chambers defined in part by structural members 18, 20 for housing drums 12 and 14, respectively; said chambers share a common central structural member 19. As shown in all figures but as perhaps best shown in FIG. 3, loading chutes 22, 24 are mounted in their respective chambers below the uppermost periphery thereof. Each chute extends radially inwardly, is sloped downwardly, and includes a large central feed opening 26, 28, respectively, as perhaps best shown in FIG. 2.

Figure 3:
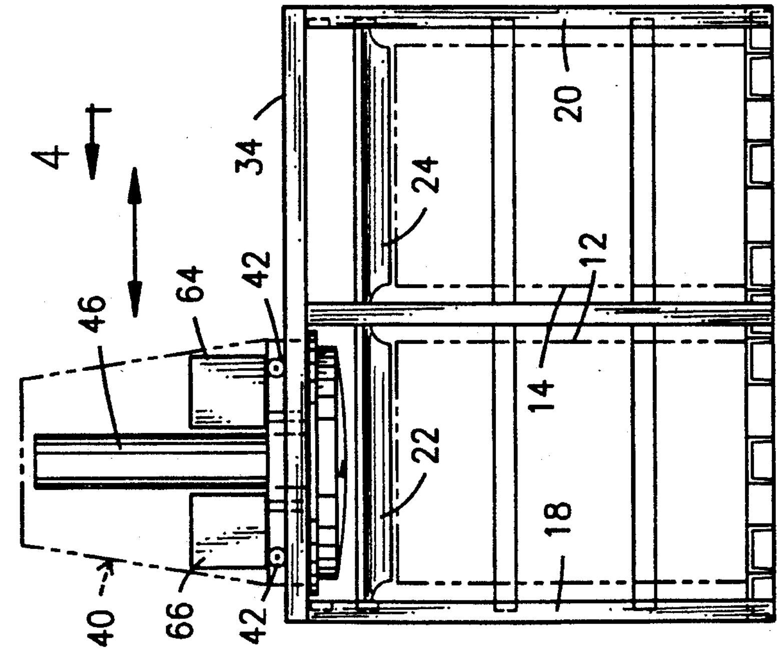
FIG. 3 is a front elevational view thereof.

It should be clear from FIGS. 1 and 3 that loading chutes 22, 24 enable flotsam to be quickly charged into their associated drums 12, 14; during a cleanup operation, time cannot be taken to carefully place flotsam into each drum. Instead, solids and the oil clinging thereto will be tossed into each drum in great haste; the loading chutes guide the flotsam into each drum and suppress splashing of oil and water as the flotsam is tossed into each drum.

A pair of parallel track members 30, 32 (see FIGS. 1 and 4) is fixedly secured to the respective inboard sides of top rails 34, 36, of frame 16. The compressing and separating means, hereinafter described, reciprocates along said tracks when apparatus 10 is in use as will become more clear hereinafter.

A single compressing and separating means serves both drums 12 and 14; it is denoted 40 as a whole and is hereinafter referred to as the traversing saddle. As shown in FIG. 1, when traversing saddle 40 is in registration with drum 12, flotsam may be charged into drum 14; when traversing saddle 40 is in registration with drum 14, flotsam may then be charged into drum 12.

Wheels, collectively denoted 42, are rotatably mounted to traversing saddle 40 at the lowermost edge thereof as shown and said wheels rotatably engage tracks 30 and 32 to enable lateral reciprocation of said saddle 40 along the extent of said tracks. The reciprocation could be automatic, semi-automatic or manual; in the preferred embodiment, the reciprocation is accomplished manually by an attendant.

Note in FIG. 1 that hold down means 44 is provided to perform the function its name implies, i.e., to hold down saddle 40 during the time flotsam is being compacted in the manner to be described. More particularly, the hold down means 44 is provided in the form of an angle iron member that extends under track members 30, 32; the vertical part of each angle iron is fixedly secured to saddle 40.

Figure 5:
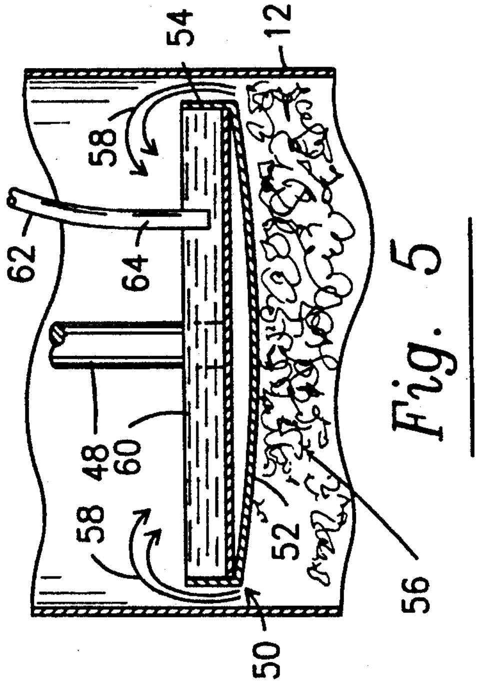
FIG. 5 is a sectional view taken along line 5—5 in FIG. 4.
Figure 4:
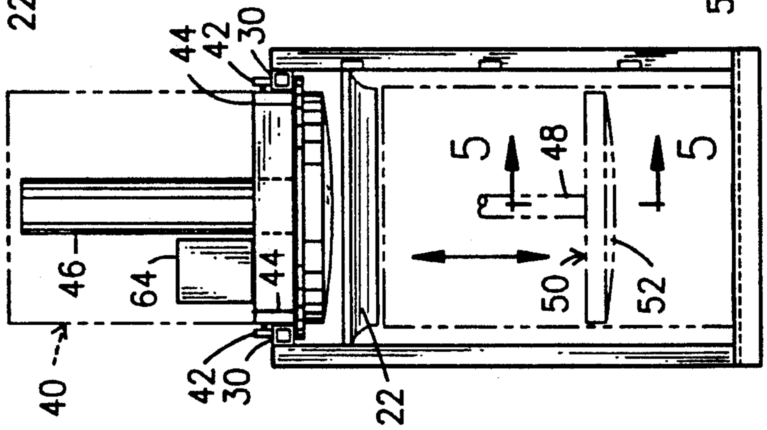
FIG. 4 is a sectional view taken along line 4—4 in FIG. 3.

Traversing saddle 40 is hollow and houses tube 46 (FIGS. 3 and 4) that telescopically receives ram 48 (FIGS. 4 and 5). A press head 50 having a convex leading end or platen 52 is mounted to the leading end of said ram 48. As best shown in FIG. 5, an upstanding retention wall 54 is mounted about the periphery of platen 52 and extends therefrom in trailing relation thereto. The diameter of platen 52 and hence the diameter of the retention wall 54 is about five centimeters less than the diameter of drum 12 or 14. Thus, when press head 50 travels downwardly into drum 12 or 14, flotsam 56 is forced downwardly into the drum, but liquid components thereof are free to flow upwardly and radially outwardly relative to the bottom center of the drum as indicated by directional arrows 58 (FIG. 5), i.e., the liquid components flow into the annular space between the press head 50 and the interior cylindrical sidewalls of the drum 12 or 14. Upon rising higher than the upper edge or rim of the retention wall 54, said liquid components collect as indicated by reference numeral 60 in the collection basin formed on the trailing end of said press head 50.

A plurality of radially extending grooves 51 may be formed in the convex face 52 of platen 50; these grooves enhance the flow of the liquids out from under the platen as it descends into the container.

A splash guard 49 is carried by ram 48 in trailing relation to compaction platen 50; it performs the function expressed by its name and is slidably mounted on said ram and has a diameter greater than the diameter of feed opening 26 or 28 so that it covers said feed opening when platen 50 extends downwardly therethrough. The platen clears the feed opening 26 or 28 by about two centimeters. When ram 48 is traveling upwardly, splash guard 49 travels with it, thereby unsealing the feed opening, until it encounters the lowermost end of tube 46.

Flexible conduit 62 (FIG. 5) has its leading end 64 immersed in the liquid 60 and its trailing end is in fluid communication with a source of negative pressure, not shown, so that said liquid may be vacuumed from the collection basin as needed. When the basin is emptied, vacuum is lost and a suitable control means shuts down the vacuum source. Note that conduit 62 could be positioned outside of ram 48 as shown in FIG. 5 or inside it. In either arrangement, the flexibility of conduit 62 enables it to travel with pressure head 50 throughout its stroke. In the contemplated commercial embodiment of the invention, the length of the ram stroke Will be about one meter.

Since the flotsam may include highly volatile materials, governmental regulations do not permit the use of electrical controls or other controls that might produce a spark. Accordingly, apparatus 10 is built in compliance with 33 C.F.R. 183, entitled "Ignition-Protected Equipment." More particularly, an air-driven hydraulic pump 64 (FIGS. 3 and 4) is employed to reciprocate ram 48; said pump 64 is under the control of control means 66. In the contemplated commercial embodiment, the primary driver is a variable speed air motor that is operated and controlled by the ship's 125 psi service air. The driven element is a two-stage hydraulic gear pump delivering a combined volume of about twelve liters per minute of hydraulic oil under standard conditions. Press force is achieved through a six centimeter bore double-acting hydraulic cylinder.

Control means 66 is in communication with a pressure sensing means associated with convex platen 52 so that when the resistance to continued downward travel of press head 50 exceeds a predetermined threshold, the direction of travel of said press head is reversed. Accordingly, the length of the stroke of press head 50 decreases as a drum fills up with solids until the drum is completely full. Control means 66 then shuts off the reciprocation of ram 48 so that the full drum can be removed from its chamber and an empty one inserted in its stead. While a full drum is being removed and an empty one replaced in its stead, the operator shifts the traversing saddle 40 over to the adjacent chamber and depresses a lever to restart the reciprocation of the press head 50 so that the separation process commences in said other drum. The alignment of the press head 50 with respect to the opening defined by the loading chutes is automatically controlled by suitable means.

Removal of full drums and reinsertion of empty drums into the compaction chambers is facilitated by a cart or porter 70, as depicted in FIG. 1. It includes wheels 72 and fork lift truck-type forks 74 that project forwardly to support the drum. Handle 76 is conveniently located so that the drums can be carted about with a minimum amount of effort. Due to the ease by which full drums may be removed and emptied drums may be inserted into the apparatus, and due to the automatic, pressure-sensitive reciprocation of pressure head 50 and the ease by which said pressure head may be shifted laterally when a drum is filled with solid, compressed flotsam, it should be apparent that the novel device may operate continuously. Thus, it is a batch processing device that operates continuously like a non-batch device.

The steps of the novel method are thus understood to include charging solid and liquid objects into an open topped container, inserting a platen into said container to compress the solid objects, mounting an upstanding retention wall about a trailing end of said platen, dimensioning said platen and said container so that when liquid in said container is displaced by said platen as said platen compresses said solid objects, said displaced liquid is constrained to flow radially outwardly and upwardly between said retention wall and side walls of said container and then radially inwardly and over the retention wall, so that the displaced liquid is collected atop the trailing end of the platen. The method further includes the steps of continuously, or periodically removing the collected liquids from the basin defined at the trailing end of the platen. These method steps and others are apparent from the description of the preferred embodiment of the apparatus.

The apparatus and method disclosed herein are not limited to use in oil spill operations and may be advantageously used in many other applications. For example, the apparatus may be employed onboard a ship dedicated to oil spill containment operations for routine trash disposal. Moreover, it can be used on land by industry, schools, government, and the like and in aircraft, spacecraft, or ships and submarines not dedicated to oil spill containment operations, for example.

This invention is clearly new and useful. Moreover, it was not obvious to those of ordinary skill in this art at the time it was made, in view of the prior art considered as a whole as required by law.

This invention pioneers the art of liquid/solid separators having utility in oil spill cleanup operations and many other applications. Accordingly, the claims that follow are entitled to broad interpretation, as a matter of law, to protect from piracy the heart or essence of this breakthrough invention.

It will thus be seen that the objeots set forth above, and those made apparent from the foregoing description, are efficiently attained and since certain changes may be made in the above construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, what is claimed is:

1. An apparatus for separating liquids and solids, comprising:

a frame for said apparatus;

a compaction platen supported at least in part by said frame and mounted for reciprocation in a vertical plane between an uppermost position and a lowermost position;

said platen disposed in axial alignment with a container having an open top;

reciprocation means for reciprocating said platen in a vertical plane between said uppermost position and a lowermost position;

said platen having a predetermined breadth less than a predetermined breadth of said container;

said uppermost position of said platen being above said container;

said lowermost position of said platen being within said container at a predetermined distance below the open top of said container;

an upstanding retention wall, of predetermined height and for retaining liquid, being mounted about the periphery of said platen in trailing relation thereto; and said retention wall and a trailing end of said platen collectively defining a liquid collection basin;

whereby solids and liquids are separated from one another when said platen is displaced downwardly into said container as solids are driven towards a bottom wall of said container and liquids are squeezed therefrom, and said liquids are constrained by said platen to flow radially outwardly and upwardly and between the sidewalls of the container and said retention wall until the level of said liquids exceeds the height of said retention wall so that said liquids flow radially inwardly over said retention wall and collect in said liquid collection basin.

2. The apparatus of claim 1, further comprising liquid removal means for emptying liquid from said liquid collection basin.

3. The apparatus of claim 2, wherein said liquid removal means includes a conduit means having a leading end disposed in closely spaced relation to said trailing end of said platen and a trailing end of said conduit means being disposed in fluid communication with a source of negative pressure so that said conduit means carries liquid out of said liquid collection basin when said source of negative pressure is activated.

4. The apparatus of claim 3, wherein said platen has a convex leading end.

5. The apparatus of claim 4, further comprising a plurality of radially extending flutes formed in the convex leading end of said platen, said flutes serving to guide liquid into the space between said container walls and the liquid retention wall and hence into said liquid collection basin.

6. The apparatus of claim 3, further comprising pressure sensitive means associated with said platen for changing the direction of travel of said platen when said platen encounters a preselected resistance to its downward travel, said resistance being caused by solids accumulated in said container and said platen having a stroke that progressively shortens as said container fills and which returns to its full extent when said container is emptied.

7. The apparatus of claim 3, wherein said frame includes a first and a second compaction chamber disposed in lateral relation to one another for holding a first and second container therein, respectively.

8. The apparatus of claim 7, further comprising means for reciprocating said platen between said first and second compaction chambers so that when said platen is separating solids from liquids in said first container, said second container may be charged with flotsam or removed from its compaction chamber if full of compressed solids, and so that when said platen is separating solids from liquids in said second container, flotsam may be charged into said first container, whereby charging of flotsam into a container may continue without interruption.

9. The apparatus of claim 8, wherein said means for reciprocating said platen includes a pair of parallel, elongate track members supported by said frame, said track members being disposed above said first and second compaction chambers.

10. The apparatus of claim 9, further comprising a ram means, wherein said platen is the leading end of said ram means, and further comprising a traversing saddle means for housing said ram means.

11. The apparatus of claim 10, wherein said traversing saddle means is supported by said track members, and further comprising lateral displacement means for enabling reciprocation of said traversing saddle means along the extent of said track members so that said traversing saddle means is selectively positionable in axial alignment with said first and second compaction chambers and hence said first and second containers, respectively.

12. The apparatus of claim 11, wherein said lateral displacement means includes a plurality of wheel members rotatably mounted to said traversing saddle means, said plurality of wheel members rollingly engaging said track members.

13. The apparatus of claim 12, further comprising hold down means connected to said traversing saddle means for holding said traversing saddle means to said track members.

14. The apparatus of claim 11, further comprising a downwardly sloping, radially inwardly extending loading chute mounted to each of said compaction chambers so that flotsam tossed atop a loading chute slides therefrom into its associated container, each of said chutes defining a central feed opening through which said platen may extend.

15. The apparatus of claim 14, wherein said ram means further includes a tubular housing and a piston rod, said tubular housing telescopically receiving said piston rod, and said piston rod having a leading end to which said platen is fixedly secured.

16. The apparatus of claim 15, further comprising a splash guard, said splash guard being carried by said piston rod and serving to close said feed opening when said platen is extended into a container.

17. A method for separating liquids and solids, comprising the steps of:

charging solid and liquid objects into an open-topped container;

inserting a platen having a flat trailing end into said container to compress the solid objects;

mounting an upstanding retention wall about said flat trailing end of said platen;

dimensioning said platen and said container so that when liquid in said container is displaced by said platen as said platen compresses said solid objects, said displaced liquid is constrained to flow upwardly between said retention wall and sidewalls of said container and then radially inwardly and over said retention wall, said displaced liquid being collected atop said flat trailing end of said platen; and removing said collected liquids from said flat trailing end of said platen.

18. The method of claim 17, further comprising the step of configuring a leading end of said platen to have a hemispherical shape so that solids compressed thereby are not trapped thereunder.

19. The method of claim 18, further comprising the step of forming a plurality of radially extending flutes on said hemispherical leading end to channel liquids separated from said solids in a radially outward direction.

20. The method of claim 19, further comprising the step of retracting said platen from said container when resistance to downward travel of said platen reaches a predetermined amount.

21. The method of claim 20, further comprising the step of positioning a second container in closely spaced relation to the first-mentioned container and reciprocating said platen between the first-mentioned container and the second container so that the separation process can be carried on substantially continuously.

22. The method of claim 21, wherein the step of removing the liquids collected atop the trailing end of said platen includes positioning a leading end of a conduit means in closely spaced relation to said trailing end of said platen and connecting a trailing end of said conduit means to a source of negative pressure.

* * * * *